United States Patent [19]

Weyer

[11] Patent Number: 4,902,120

[45] Date of Patent: Feb. 20, 1990

[54] EYEGLASS HEADPHONES

[76] Inventor: Frank M. Weyer, 81 Toilsome Ave., Norwalk, Conn. 06851

[21] Appl. No.: 274,491

[22] Filed: Nov. 22, 1988

[51] Int. Cl.⁴ .............................................. G02C 1/00
[52] U.S. Cl. ....................................... 351/158; 351/41
[58] Field of Search ........................... 351/41, 111, 158

[56] References Cited

FOREIGN PATENT DOCUMENTS 2559279  8/1985  France ................................. 351/158
0113912  7/1983  Japan .................................. 351/158

Primary Examiner—Rodney B. Bovernick

[57] ABSTRACT

Means for attaching personal stereo headphones to eyeglass frames. Eyeglasses incorporating personal stereo headphones attached to the eyeglass temples with the headphones leads contained in a neckstrap.

10 Claims, 4 Drawing Sheets

EYEGLASS HEADPHONES

BACKGROUND OF THE INVENTION

Over the past several years, personal portable stereos such as the "Sony Walkman (Reg. TM)" have become very popular. These personal stereos generally consist of a small radio or cassette player unit, generally about the size of a standard audio cassette tape (some radio-only units are as small as credit cards) together with a set of lightweight headphones. The headphones are attached to the radio or cassette player unit by a pair of long, thin wires and a standard stereo headphone plug.

The most common headphones consist of two foam-padded ear pieces attached to a flexible metal headband. These headphones work quite well. They are, however, unsightly, and cannot be worn under hats.

A second type of headphone is known as an "in-the-ear" headphone. This type of headphone consists of two small earpieces designed to fit inside the outer ear. No other means are used to maintain the earpieces in place. These headphones are less unsightly than the flexible headband type, although the wires dangling from the earpieces are also not very attractive. In addition, the earpieces tend to fall out of the ear, especially during physical activities such as jogging. Furthermore, the wires leading to the earpieces tend to tangle when removed from the ears, causing a great deal of inconvenience.

Over the last few years, sunglasses have once again become very popular. One type of sunglasses, popularized by such TV shows as "Magnum P.I." and "Miami Vice" comprises a neck-strap attached to the temples of the sunglasses. These are considered stylish, and allow the sunglasses to be worn like a necklace when they are not used to shield the eyes.

SUMMARY OF THE INVENTION

The first embodiment of the present invention comprises a clip for attaching the earpieces for personal stereos to eyeglasses or sunglasses. This embodiment eliminates the need for an unsightly headband, can be worn with a hat, and maintains the earpieces in position even during jogging or other physical activities.

The second embodiment of the present invention comprises neck-strap type sunglasses incorporating headphone earpieces. Conductors are incorporated in the sunglass frame and neck strap, eliminating the unsightly wires used in the prior art.

The third embodiment of the present invention comprises sunglasses incorporating a radio and headphones in a single unit. This embodiment may also incorporate photovoltaic regions in the sunglass lenses.

DETAILED DESCRIPTION OF THE INVENTION

Figure 1:
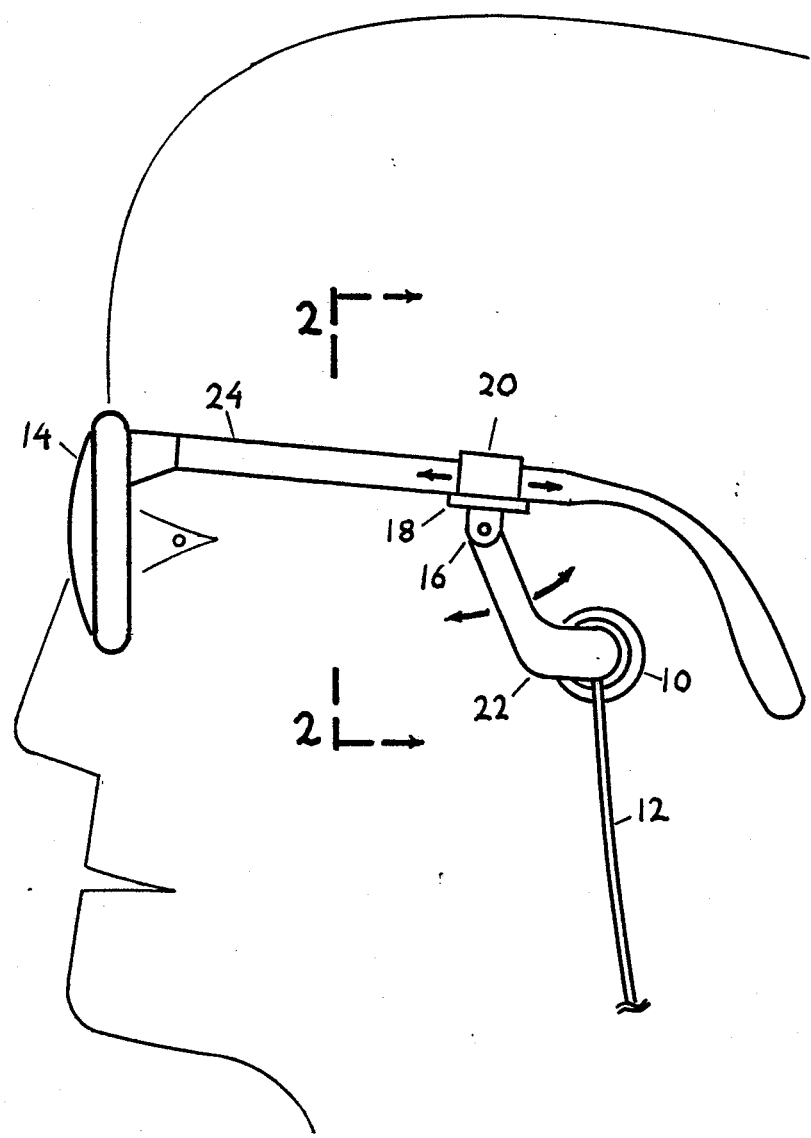
FIG. 1 is a side view of a pair of eyeglasses to which the headphone clip of the present invention is attached.
Figure 2:
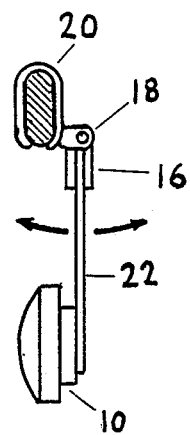
FIG. 2 is a close-up sectional view along line A—A in FIG. 1 showing how the headphone clip is attached to the eyeglasses.

The first embodiment of the present invention is shown in FIG. 1. In comprises a clip for attaching a headphone earpiece 10 to an eyeglass frame 14. In the embodiment shown, the clip comprises a channel section 20, the cross-section of which is shown in FIG. 2, that clips over a sidepiece 24 (called the "temple") of the eyeglasses. The channel section 20 is slideable along the temple. The earpiece 10 is attached to an arm 22. In the embodiment shown, the arm is attached to the channel section 20 by means of pivoting sections 16 and 18, which allow for adjustment of the earpiece position. However, arm 22 may also be made of a flexible material that allows positioning without the need for pivots, and may be directly connected or integrally formed with channel section 20. Headphone lead 12 leads from the earpiece 10 to the personal stereo unit, which is not shown.

The second embodiment of the present invention is shown in FIG. 2. This embodiment comprises a pair of eyeglasses or sunglasses to which a headphone earpiece unit 38, similar to the previous embodiment, is attached. Instead of the earpieces having exposed headphone leads, however, in the present embodiment the leads are incorporated in the temple 30 and the neckstrap 34. The section of the leads from the earpieces 42 to the neckstrap 34 may consist of conductive strips on the outside surface of the temple, or wires that pass through a hollow section through the center of the temple, or some other conductive means incorporated in the temple. Similarily, wires or a conductive foil comprise the portions of the leads incorporated in the neckstrap. In the preferred embodiment, the lead from the left earpiece and the right earpiece are attached to a connector 44 at the middle of the neckstrap, i.e. the portion of the neckstrap that ordinarily rests on the back of the wearer's neck. A lead 46 runs from the connector 44 to the personal stereo unit. The lead may be fixedly attached to connector 44, or may be made removable by incorporating a standard stereo headphone socket on the connector and a plug on the headphone lead, as shown.

The earpiece 38 preferably is slidably be mounted on the temple to allow for adjustment of the earpiece position. Preferably, the earpiece can be plugged into a slidable socket 36, making earpiece 38 removable. Neckstrap 34 may also be removable, such that the sunglasses can also be used as regular sunglasses.

Figure 3:
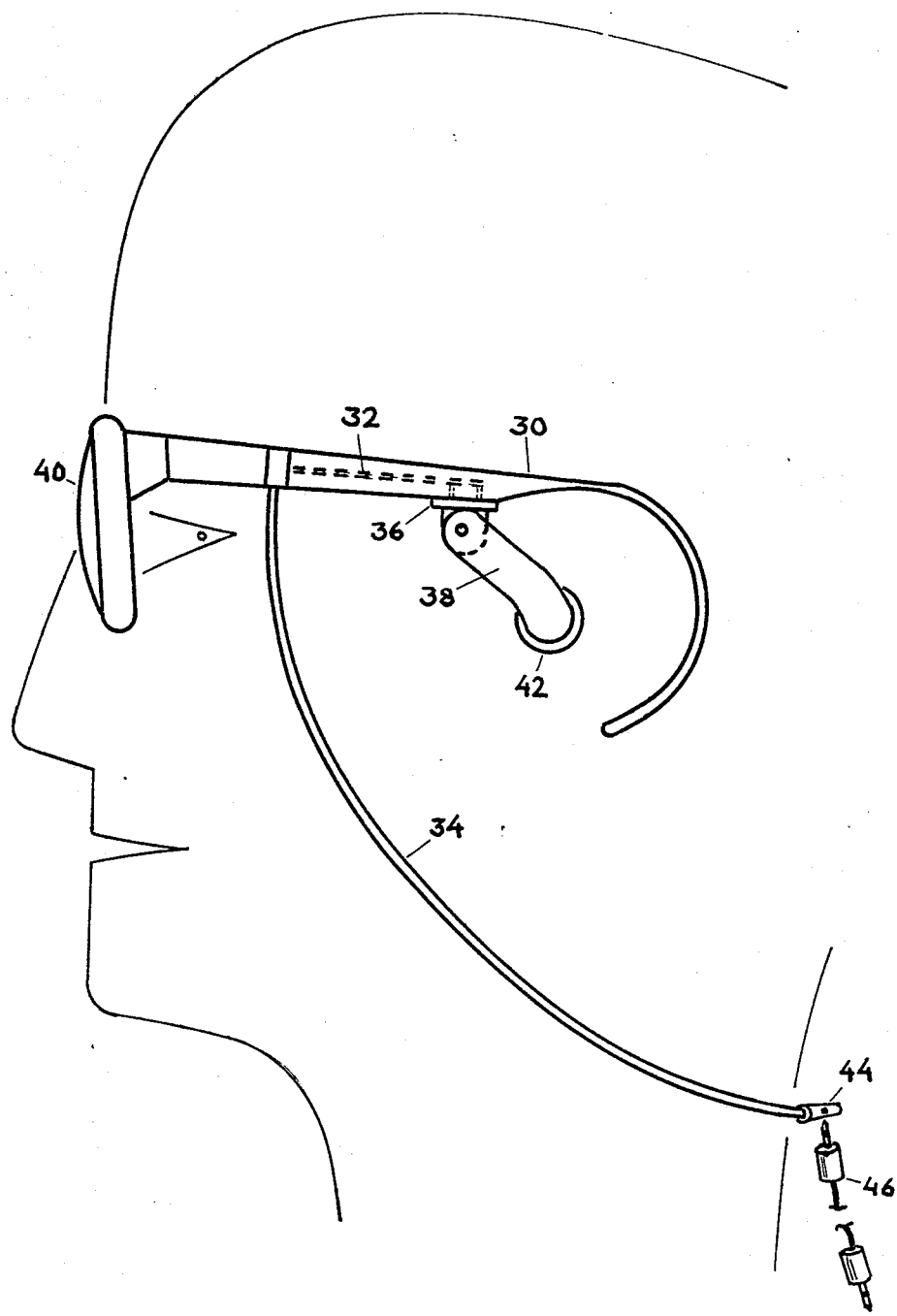
FIG. 3 is a side view of a neck-strap type sunglasses of the present invention incorporating headphone earpieces in the sunglass frame and the headphone leads in the neckstrap.
Figure 4:
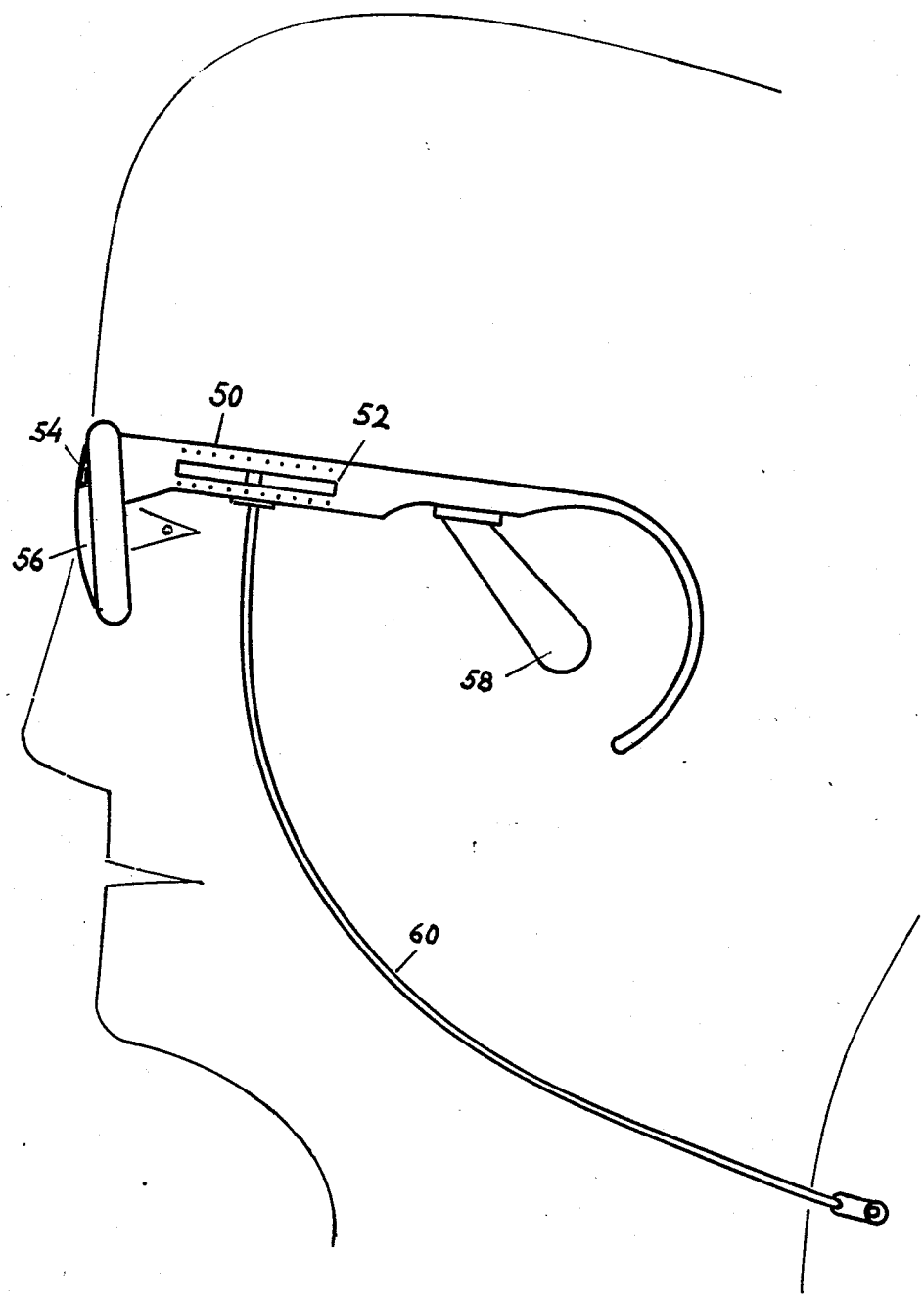
FIG. 4 is a side view of sunglasses of the present invention also incorporating a radio receiver in the sunglass frame.

FIG. 4 shows a further embodiment of the eyeglasses of FIG. 3 in which a radio receiver is incorporated in the eyeglass frame. The miniature circuits used are well known in the art. The components of the radio receiver may be mounted in the temples and the browpiece of the eyeglasses in a variety of configurations. In the embodiment shown in FIG. 4, a sliding control 52, either a volume control or a tuning control, is mounted on each of the temples 50. A region of photovoltaic cells 54 may be incorporated in the eyeglass lenses 56 or mounted elsewhere on the frame of the glasses to help power the radio receiver. The radio circuitry may also comprise a tranceiver circuit, and the earpiece 58 may include an in-the-ear microphone, as is known in the art, allowing the eyeglasses to function as a personal communications device.

This embodiment may or may not include neckstrap 60 allowing the glasses to be used with external personal stereo devices.

Other embodiments incorporating the inventive features of the present invention will be apparent to those skilled in the art.

I claim:

1. Earpiece support means for attaching headphone earpiece means to temples of eyeglasses comprising:

attachment means attachable to and slidably mounted on said temples; and positioning arm means pivotally attached to said attachment means, said positioning arm means comprising headphone earpiece means, said positioning arm means capable of adjustably positioning, maintaining and supporting said headphone earpiece means adjacent to an eyeglass wearer's ear.

2. Earpiece support means for attaching headphone earpiece means to temples of eyeglasses comprising:

attachment means attachable to said temples;

positioning arm means attached to said attachment means, said positioning arm means comprising headphone earpiece means, said positioning arm means capable of adjustably positioning, maintaining and supporting said headphone earpiece means adjacent to an eyeglass wearer's ear; and neckstrap means for supporting said eyeglasses around said eyeglass wearer's neck when said eyeglasses are not being worn, said neckstrap means comprising a concealed wire means electrically connected to said headphone earpiece means for connecting said headphone earpiece means to an external audio signal source.

3. The earpiece support means of claim 2 wherein said positioning arm means comprises bendable semi-rigid arm means a first end of which is attached to said attachment means and a second end of which is attached to said headphone earpiece means.

4. The earpiece support means of claim 2 wherein said attachment means comprises clip means slideably mountable on said eyeglass temple.

5. The earpiece support means of claim 4 wherein said clip means comprises pivot means by which the positioning arm means is attached to said clip means.

6. Eyeglasses with temples comprising:

support arm means attached to the temples of said eyeglasses, said support arm means comprising headphone earpiece means, said support arm means capable of positioning, maintaining and supporting said headphone earpiece means adjacent to the wearer's ear when such eyeglasses are worn; and neckstrap means for supporting said eyeglasses around said eyeglass wearer's neck when said eyeglasses are not being worn, said neckstrap means comprising a concealed wire means electrically connected to said headphone earpiece means for connecting said headphone earpiece means to an external audio signal source.

7. The eyeglasses of claim 6 wherein said support arm means comprises bendable semi-rigid arm means a first end of which is attached to said temple means and a second end of which is attached to said headphone earpiece means.

8. The eyeglasses of claim 6 wherein said support arm means is removably attachable to said temples.

9. The eyeglasses of claim 6 wherein said support arm means is attached to said temples by a pivot means.

10. The eyeglasses of claim 6 wherein said neckstrap comprises a connecting means for removably attaching wire means for electrically connecting said concealed wire means to said external audio signal source.

* * * * *